United States Patent
Zeiler et al.

(10) Patent No.: US 8,181,793 B2
(45) Date of Patent: May 22, 2012

(54) DEPTH FILTER SHEET MATERIAL AND METHOD FOR MANUFACTURING SAME

(75) Inventors: Martin Zeiler, Schwaebisch Gmuend (DE); Klaus Feifel, Schwaebisch Gmuend (DE); Wolfgang Diemer, Waldstetten (DE)

(73) Assignee: Pall Corporation, Port Washington, NY (US)

( * ) Notice: Subject to any disclaimer, the term of this patent is extended or adjusted under 35 U.S.C. 154(b) by 363 days.

(21) Appl. No.: 12/552,544

(22) Filed: Sep. 2, 2009

(65) Prior Publication Data

US 2010/0072128 A1    Mar. 25, 2010

(30) Foreign Application Priority Data

Sep. 19, 2008   (EP) ..................... 08016525

(51) Int. Cl.
*B01D 39/16*  (2006.01)
*B01D 29/00*  (2006.01)
*B01D 39/00*  (2006.01)

(52) U.S. Cl. .................. 210/500.22; 210/490; 210/491; 162/109; 55/DIG. 5

(58) Field of Classification Search .................. None
See application file for complete search history.

(56) References Cited

U.S. PATENT DOCUMENTS

| | | | |
|---|---|---|---|
| 3,640,839 A * | 2/1972 | Ochiai | 162/129 |
| 4,793,923 A * | 12/1988 | Kadoya et al. | 210/491 |
| 4,955,995 A | 9/1990 | Pontius | |
| 5,026,487 A | 6/1991 | Abdulmassih | |
| 5,219,469 A | 6/1993 | Binzer et al. | |
| 5,609,761 A * | 3/1997 | Franz | 210/493.1 |
| 5,614,105 A | 3/1997 | Heilmann et al. | |

(Continued)

FOREIGN PATENT DOCUMENTS

DE    276 427    2/1990

(Continued)

OTHER PUBLICATIONS

"Brautechnische Analysenmethoden" vol. IV, pp. 1 to 2, published in 1998 by MEBAK.

*Primary Examiner* — Nam Nguyen
*Assistant Examiner* — Madeline Gonzalez
(74) *Attorney, Agent, or Firm* — Leydig, Voit & Mayer, Ltd.

(57) ABSTRACT

The present invention relates to a method for manufacturing a depth filter sheet material, the method comprising preparing a flowable aqueous pulp composition comprising a fibrous material and a binding agent; dispensing the flowable aqueous pulp composition onto a water permeable support in a predetermined amount per unit area; at least partially draining the water content of the aqueous pulp composition through said water permeable support; drying the at least partially drained pulp composition at an elevated temperature to form a depth filter sheet raw material comprising a first and a second surface section forming an upper and a lower surface of the sheet raw material, respectively, and an intermediate section positioned in between and integrally formed with the first and the second surface sections, the intermediate section having a permeability greater than the permeability of the first and second surface sections; and removing or displacing at least portions of one of the first or second surface section of the raw material. Depth filter sheet materials obtained by the method are also disclosed.

19 Claims, 7 Drawing Sheets

U.S. PATENT DOCUMENTS

| | | | |
|---|---|---|---|
| 5,830,317 A * | 11/1998 | Vinson et al. | 162/125 |
| 6,911,573 B2 * | 6/2005 | Chen et al. | 604/378 |
| 7,784,619 B2 * | 8/2010 | Jacobson | 210/500.22 |
| 2001/0037972 A1 * | 11/2001 | Quick et al. | 210/491 |
| 2001/0037982 A1 * | 11/2001 | Pulek et al. | 210/767 |
| 2003/0203694 A1 | 10/2003 | Deka et al. | |
| 2005/0279470 A1 * | 12/2005 | Redd et al. | 162/109 |

FOREIGN PATENT DOCUMENTS

| | | |
|---|---|---|
| DE | 298 24 269 | 9/2000 |
| DE | 199 56 665 | 5/2001 |
| DE | 100 38 276 | 2/2002 |
| EP | 0 529 111 | 3/1993 |
| EP | 0 701 854 | 3/1996 |
| EP | 0 715 536 | 6/1996 |
| EP | 1 040 859 A2 | 10/2000 |
| EP | 1 040 859 A3 | 10/2000 |
| WO | WO 94/09880 | 5/1994 |
| WO | WO 95/05232 | 2/1995 |
| WO | WO 97/26407 | 7/1997 |
| WO | WO 99/60206 | 11/1999 |
| WO | WO 00/20095 | 4/2000 |

* cited by examiner

DEPTH FILTER SHEET MATERIAL AND METHOD FOR MANUFACTURING SAME

CROSS-REFERENCE TO RELATED APPLICATIONS

This patent application claims priority from European Patent Application No. 08016525.1, filed Sep. 19, 2008, which is incorporated by reference.

BACKGROUND OF THE INVENTION

The present invention relates to a method for manufacturing a depth filter sheet material, especially flexible and/or self-supporting sheet materials resulting from a wet-laying process using a fibrous pulp and to depth filter sheet materials obtainable by such method.

Wet-laid filter sheet materials from a pulp can be produced easily in large quantities, in various sizes and highly reliable quality. Further, these materials may easily be adapted to the needs of numerous filtration applications. In addition, they can be manufactured from environmental friendly materials which in addition qualify for use in the food and pharmaceutical area.

Exemplary methods for making such wet-laid filter sheet materials are disclosed, e.g., in DD 276 427 A1 and DE 199 56 665 A1.

Filter sheet materials of such type are widely used in a variety of filtration applications, including but not limited to filtration of beverages, food oils, pharmaceuticals as well as raw materials, intermediates and final products in the chemical industry, mineral and hydraulic oils, blood serum, antibiotics, fermenter broths, cosmetics.

Important aspects of the filtration performance of such filter sheet materials are, e.g., their particle hold-up volume and the fluid flow resistance they present to a fluid to be filtered.

BRIEF SUMMARY OF THE INVENTION

The object of the present invention is to provide a method for manufacturing a depth filter sheet material as defined above having an improved filtration performance.

A more specific object of the present invention is to provide a method for manufacturing a depth filter sheet material which has an increased particle hold-up volume.

Another more specific object of the present invention is to provide a method for manufacturing a depth filter sheet material that constitutes a low fluid flow resistance to the fluid to be filtered.

The above objects are met by a method according to claim 1.

DETAILED DESCRIPTION OF THE INVENTION

The inventors to the present invention recognized that a depth filter sheet material manufactured in a wet-laying process regularly has a non-homogeneous cross-sectional structure although it has been made from one pulp material in a single process.

This structure includes a first and a second surface section as well as an intermediate section which differ in their permeability.

In the manufacturing process for wet-laid filter materials the fluid pulp material is provided, e.g., as an aqueous suspension of cellulose fibers and a binding agent, optionally including additives of organic or inorganic nature, e.g., fillers and/or active ingredients, and is dispensed on a water permeable support, e.g., an endless belt, which allows drainage of most of the water contents in a dewatering step. Subsequently, the dewatered but still wet sheet material is subjected to a heat treatment for finally drying the same. During the heat treatment, furthermore, the binder is activated and creates a bond between fibers of the sheet material.

Due to the dewatering and the subsequent drying step of the wet-laying manufacturing procedure a lower more dense section is created abutting the support and a more dense section is created on the opposite top surface. During the dewatering a fluid flow driven by gravity and/or suction removes most of the water content of the suspension through the support. This type of fluid flow entails a transportation or migration effect which results in a decreased permeability of the fibrous composition and, in case the inorganic additives are present, a higher ash content of the section abutting the support, in the following called bottom surface section, as compared to the ash content of the filter sheet material as a whole.

Surface tension effects tend to retain smaller particles, including fibers, on the fluid surface, i.e., pulp surface. Thereby a structure is created at the top surface section which also shows a decreased permeability and, in case inorganic additives, e.g., fillers or active ingredients, are present, also a higher ash content as compared to the filter sheet material as a whole.

In addition, a part of the water content of the suspension evaporates from the top surface which may induce a transportation or migration effect in an opposite direction to the water flowing downwards through the support.

In the section between the two surface sections the fibrous mass has a different permeability. Such part is called in the following intermediate section. The permeability observed for the intermediate section is somewhat greater than for the top and bottom surface sections, the ash content is at a lower level in case inorganic additives are present.

Further, also the two surface sections regularly differ from one another, the top surface section having a larger permeability than the bottom surface section. Such phenomenon can easily be demonstrated by placing a wet-laid sheet filter material in a filter module in two different orientations. Different filtering behavior is observed once the top surface and the bottom surface are used as upstream sections, respectively.

The inventors of the present invention recognized that the removal of one of the surface sections in part or in full and providing a less obstructed access for the fluid to be filtered to the intermediate section gives rise to a substantial increase in filtration performance. Surprisingly, a drastically increased particle hold-up volume is observed when the one surface section is made the upstream side of the filter resulting in an increase in total throughput.

Additionally or alternatively, a denser sheet filter material may be used without increasing the fluid flow resistance as compared to conventional filter sheet material. Thereby a filter process with an improved separation sharpness can be accomplished.

Further in a filtering process making use of the inventive filter material the pressure differential can be reduced without affecting filtration performance.

Especially the effect on the filtration capacity is striking since with depth filter materials partial removal of depth filter mass usually decreases the filtration capacity. Quite unexpectedly, an increase in filtration capacity, i.e., particle hold-up volume, may be obtained, even if the one surface section removed is completely in a careful and selective manner such that the body of the intermediate section remains substantially unaffected.

Thus, according to a first aspect of the present invention the depth filter sheet material is manufactured from a wet-laid fibrous mass such that it substantially consists of integrally formed first and second sections, said first section having a thickness larger than the thickness of the second section, and said first section having a permeability greater the permeability of the second section. The first section substantially corresponds to the intermediate section obtained in the wet-laying process. The second section corresponds to the top surface or bottom surface section. The respective other one of the surface sections has been completely removed.

According to a second aspect of the present invention the depth filter sheet material is manufactured from a wet-laid fibrous mass and comprises a first and a second surface section and an intermediate section positioned in between and integrally formed with the first and the second surface section. I.e., the non-homogeneous cross-sectional structure of the filter sheet material as obtained from the wet-laying process is substantially retained. Said first surface section constitutes an upstream surface of the sheet material in a filtration process and comprises a plurality of apertures extending from the upstream surface of the sheet material into the first surface section towards the intermediate section. The apertures provide a more direct, less obstructed fluid pathway from the upstream surface to the intermediate section.

Said second surface section defines a downstream surface, and said intermediate section has a greater permeability than the permeability of the first and second surface sections and provides for the major portion of particle hold-up volume.

According to an embodiment of the second aspect of the present invention the apertures transect the first surface section preferably and continue into the body of the intermediate section.

Preferably, the first surface section corresponds to the top surface section, since the effect on the increase of particle hold-up volume and decrease of fluid flow resistance is more pronounced as compared to the case where the bottom surface section comprise the apertures.

Permeability of a filter sheet material is typically determined by a method described in "Brautechnische Analysenmethoden", Vol. IV, pages 1 to 2, published in 1998 by MEBAK, 85350 Freising-Weihenstephan, Germany, Editor: Dr. Heinrich Pfenninger.

The aqueous pulp composition used in the method of the present invention comprises a fibrous material preferably selected from fibers of cellulosic origin and/or synthetic polymer fibers. The synthetic polymer fibers are preferably selected from polypropylene and polyethylene fibers.

The binding agent is typically selected from, e.g., epichlorohydrin resins and/or melamine formaldehyde resins.

Optionally, the pulp composition may further comprise one or more active ingredients and/or filler.

Examples for active ingredients are filter aids, ion exchange materials and activated carbon. The filter aids are typically selected from kieselgur, perlite and microcrystalline cellulose.

The removal of one of the surface section of the sheet material according to the first aspect of the present invention may be effected in various ways.

According to one embodiment of the present invention one of the surface sections is removed by abrasion. In another embodiment peeling or scaling off is used to remove the one surface section. Also an etching step may be used to remove the one surface section. The other remaining surface section may correspond to the top surface or bottom surface section.

Equivalent to a total removal of one of the surface sections is a process where the top surface section is treated in a needling procedure which produces completely overlapping apertures in the one surface section. Thereby the fibrous structure of the one surface section is about completely disintegrated and provides no longer a noticeable barrier for the fluid to be filtered on the upstream side of the filter sheet. In the sense of the present invention the surface section has also been removed. The permeability measured for such filter sheet material substantially corresponds to the permeability measured for filter sheet materials where the surface section has completely been abraded or otherwise scaled off.

It is noted that in such needling procedure the components of the surface section treated are not necessarily removed from the filter sheet material. A substantive part thereof which previously constituted the surface section may still remain part of the filter sheet material and is merely displaced or dislocated. Surprisingly, this is sufficient to obtain the inventive effect on the increase in particle hold-up volume and decrease of the fluid flow resistance.

Preferably the one surface section removed is the top surface section since the inventive effect is more pronounced then with the bottom surface section.

In the depth filter sheet material according to the first aspect of the present invention where the sheet material substantially consist of two sections only, the first section preferably has a thickness which amounts to about 2 times the thickness of the second section or more, more preferably about 5 times or more, even more preferably about 10 times or more. In a filtration procedure the filter sheet material is positioned such that first section constitutes the upstream surface.

The thickness of the second section which has a lower permeability is of less importance since it needs not contribute to the filtration capacity, i.e., the particle hold-up volume. The thickness of the second section is preferably made as small as possible so as to provide a maximum thickness for the first section. Thus, a maximum portion of the volume of the sheet material is available for providing particle hold-up capacity.

In contrast to the first aspect of the present invention the depth filter material according to the second aspect typically retains one surface section of the sheet material as provided by the wet-laying process in full and the other one in part.

As noted above, the apertures provided in the one surface section representing the upstream surface provide an improved, more direct and less obstructed access to the intermediate section.

The intermediate section corresponds in its structure to the first section of the depth filter sheet material according to the first aspect of the present invention.

In order to make maximum use of the filter capacity of the intermediate section the apertures are distributed in a regular pattern about the upstream surface of the sheet material.

If the apertures are provided by partly abrading the upstream surface section somewhat irregular patterns of the apertures are created if the upstream surface section corresponds to the top surface section of the wet-laid filter sheet material. This is caused by the irregular surface topology of the top surface section. Nevertheless, also in such embodiments a substantial increase in filtration capacity and a decrease in pressure drop over the filter sheet are reliably obtained.

A noticeable effect is observed when the surface area of the upstream surface section is covered by apertures which sum up to a percentage of the overall surface of about 5%. The apertures are formed by removal and/or displacement of the material forming the first surface section.

More preferable is a sheet material where the proportion of the upstream surface area covered by the plurality of apertures amounts to about 10% of the total surface area or more.

From the above explanation of the first aspect of the invention it is easily understood that the apertures surface area may be increased to about 100%.

On the other hand the proportion of the upstream surface area covered by the plurality of apertures may be limited to about 80% or less without much detrimental effect to particle hold-up volume and pressure drop.

The size of the apertures of the sheet material of the present invention should be large enough to avoid a sort of filtering effect and allow easy access for the fluid to be filtered to the intermediate section and may thus be selected in accordance with the specific particulate matter contained in the fluid to be filtered.

The average area covered by an aperture therefore preferably corresponds to about 1 µm² or more. Apertures as small as about 1 µm² or more are easily obtained in a laser treatment of the filter sheet material.

If the apertures are to be created mechanically, e.g., by needling, apertures of about 5 µm² or more are preferred.

Above a certain size of the apertures, depending in addition on the number of apertures per area unit the upstream surface section may loose its coherence.

A preferable upper limit for the average area covered by an aperture is about 100 mm².

While apertures extending into the upstream surface section may already be sufficient to provide an enhanced filtration capacity, the extension of the apertures preferably amount to about 5% of the overall thickness of the sheet material or more. This not only makes sure that the apertures transect in all portions of the sheet material the upstream surface section to a sufficient extent but also provides a noticeable additionally increased of the surface area on the upstream side of the filtration material.

In a preferable sheet material the extension or depth of the apertures amount in the average to about 10% of the thickness of the sheet material or more. This provides for a further increased surface area.

This is even more pronouncedly the case when the extensions of the apertures amount in the average to about 40% of the thickness of the sheet material or more.

In order not to risk the safety of the filtration process the apertures have extensions amounting in the average to about 90% of the thickness of the sheet material or less.

The upper limit for the penetration to some extent depends on the characteristics of the second surface section the higher density of which serves as a security section which prevents a by-pass even when the extension of the apertures is large.

Still more preferable sheet materials of the present invention show extensions of the apertures amounting in the average to about 80% of the thickness of the sheet material or less.

In a number of sheet materials a maximum effect of increased filtration capacity is obtained when the extensions of the apertures amount in the average to about 75% of the thickness of the sheet material or less.

While the penetration of the apertures to a depth of about 50% of the thickness of the sheet material may typically provide an increase of the filtration capacity as compared to the sheet material having no apertures in the upstream surface section of 15% the increase of the average depth of the apertures to 75% of the thickness of the sheet material provides an increase in filtration capacity of 30%, i.e., the double effect.

According to a further parameter favourable performance is obtained when the sheet material comprises apertures which provide an increase of the upstream surface area of about 300% or less as compared to the upstream surface of the sheet material not comprising the apertures.

A preferred lower limit for the average number of apertures is about 1 aperture or more per square cm, especially 5 or more.

Preferably, the average number of apertures per square cm at the first surface section is about 600 or less.

While the shape of the apertures is not of primary importance and a broad variety of different shapes provide comparable results in a preferable sheet material the apertures have an essentially circular cross-section. Such structure is easily obtained by a needling or punching step.

Needling is a preferred method to provide the apertures since the conical shape of the needles easily disrupts, displaces and at least partly disintegrates the fibrous structure of the upstream surface section.

The average diameter of the apertures is preferably smaller than the average extension into the sheet material thereof.

The sheet material preferably has an intermediate section with a substantial homogeneous structure.

In cases where the extension of the apertures in perpendicular direction to the sheet material is limited to about the thickness of the top surface section the intermediate section may preferably have a structure with an increasing density (decreasing permeability) in direction from the first surface section to the second surface section.

Figure 1:
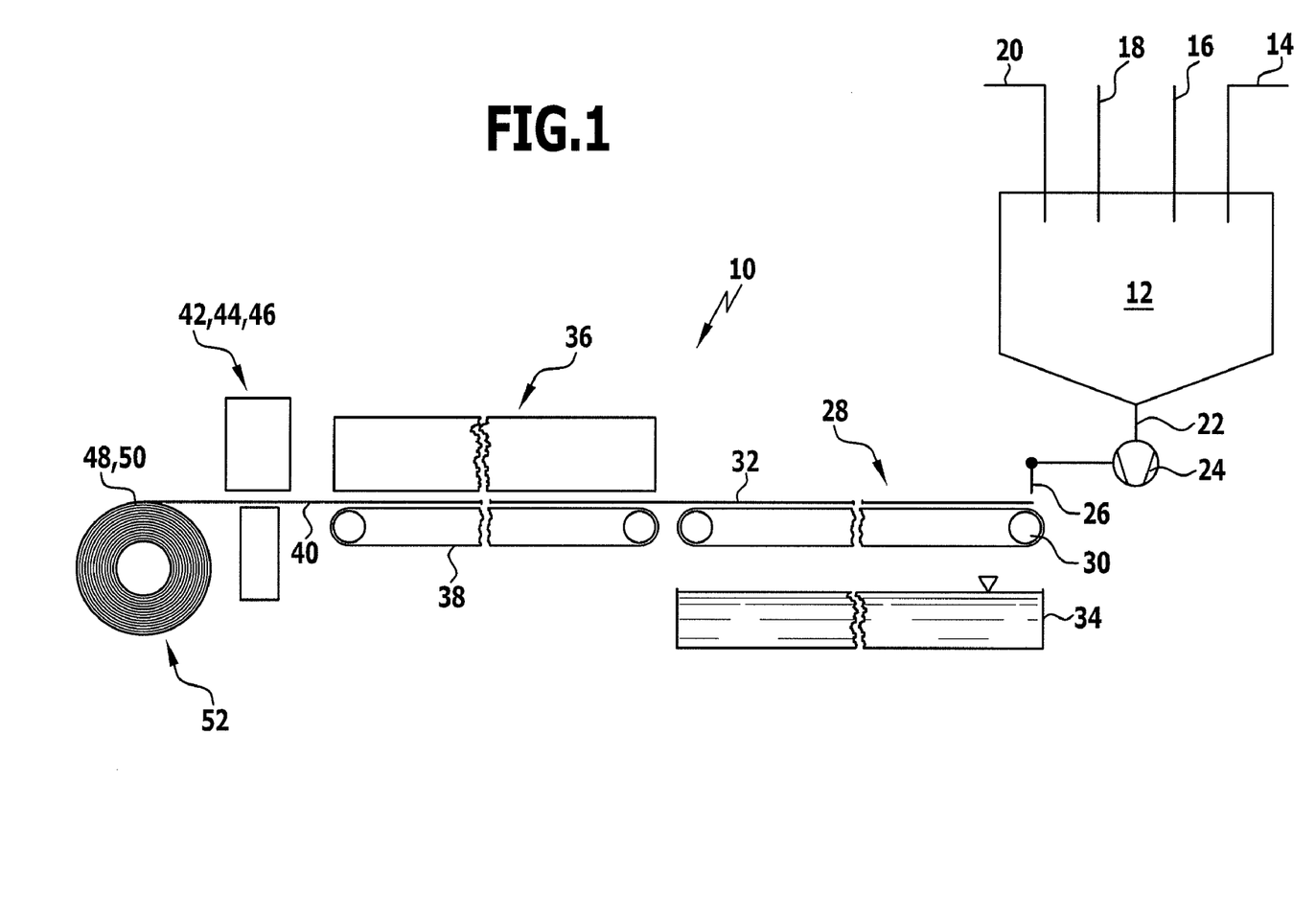
FIG. 1 is a schematic representation of a manufacturing set-up for inventive filter sheet material.

FIG. 1 shows a schematic representation of a typical manufacturing set up 10 for the inventive filter sheet material.

The manufacturing set up 10 comprises a mixing vessel 12 which receives water, pulp, binder and other additives from supply lines 14, 16, 18, 20. These components are homogeneously mixed in vessel 12 to form a pulp suspension.

The pulp suspension is withdrawn from the vessel 12 at its bottom portion via a drain line 22. Drain line 22 is equipped with a pump 24 which feeds the pulp to a dispensing device 26 in a controlled fashion.

The pulp suspension is evenly dispensed on to a continuously operated endless belt 30 of a conveyor device 28. The endless belt 30 is made of a water pervious screen or mesh material. Water is drained from the pulp suspension through the belt and collected in a receptacle 34 while a partially dewatered pulp suspension transforms into a strip 32 of dewatered pulp sheet.

Drainage of the water may be supported by suction (not shown).

The strip of pulp sheet 32 is supported by the rolling belt 30 and travels to a thermal dryer 36 where it is further supported on an endless belt 38 of water pervious material. During the residence time within thermal dryer 36 further amounts of water are removed from the dewatered pulp sheet or strip 32 by evaporation. The binder material is heat-activated and transforms the pulp sheet 32 into a self-supported wet-laid fibrous filter sheet material 40.

As will be explained in more detail below, the wet-laying process produces a sheet material 40 with a three-sectioned structure, including more dense top and bottom surface sections and a less dense intermediate section.

Figure 2A:
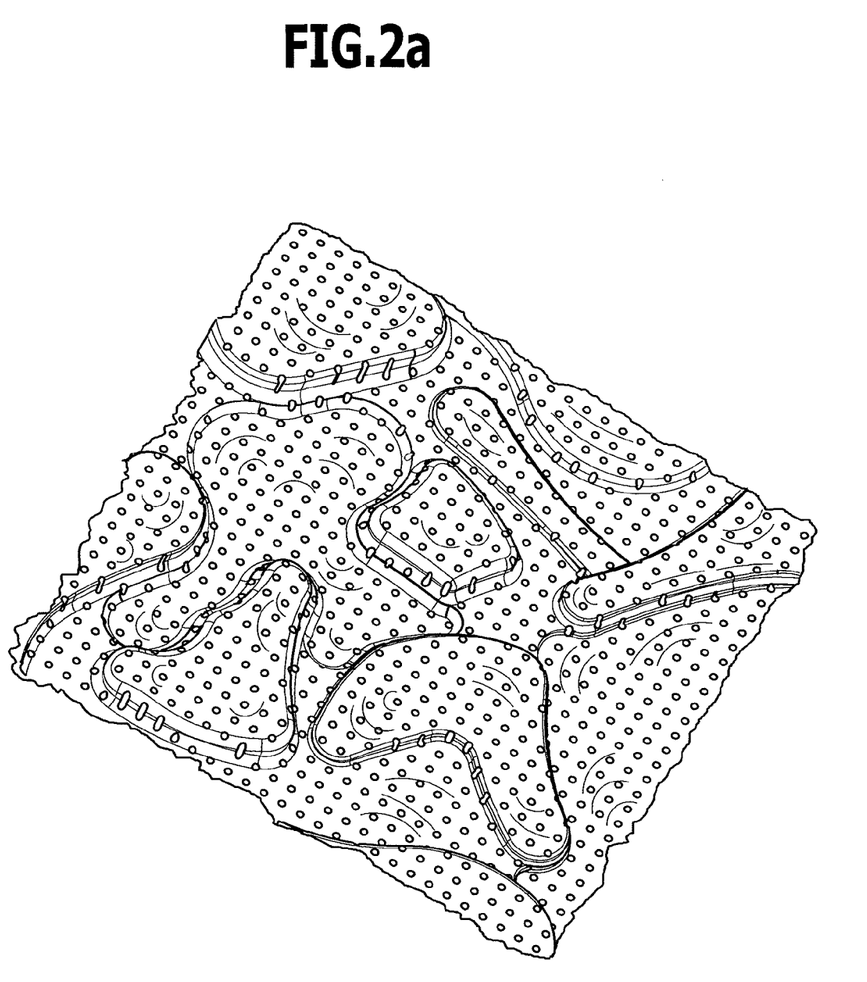
FIGS. 2a and b show enlarged photographs of a top and bottom surface of conventional wet-laid filter sheet material.
Figure 2B:
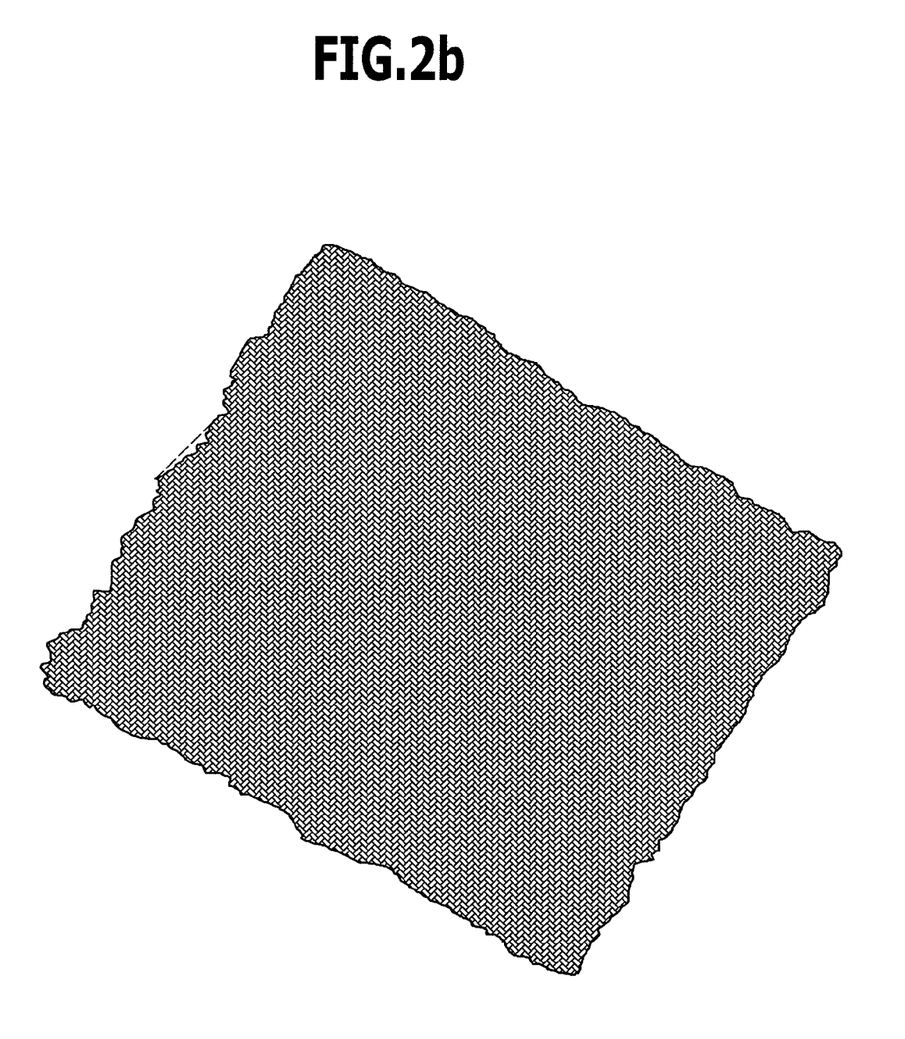

FIGS. 2a and 2b show enlarged photographs of the top and bottom surface structure obtained from the sheet material 40. The top surface has a sort of uneven or ripply structure which results from a not exactly homogeneous dewatering process (FIG. 2a). The bottom surface shows a grid-like pattern reflecting the surface structure of the mesh of the belt 30.

Since an accurate determination of the surface area of the top surface section would be laborious when reference to surface areas is made or ratios of surface areas are addressed herein the area of a hypothetical mid plane is used as a basis for calculations. The area covered by apertures formed in the top surface section then refers to the area of their projection onto such mid plane. The same concept applies when the bottom surface is used as the upstream surface section.

In order to obtain a sheet material according to the present invention the sheet material 40 is subjected to a further process which, according to the first aspect of the present invention removes one of the surface sections completely. In a set-up for producing such a type of sheet material a device 42 is used which abrades, scales or peels off the one surface section such that the intermediate section is completely exposed. The final sheet material which represents an inventive sheet material 48 is wound on a roll 52 or cut into size.

In the alternative the sheet material may be subjected to an overlapping needling process disintegrating substantially completely the one surface section. The effect obtained is comparable to the abrading or scaling process.

According to a second aspect of the present invention the sheet material 40 is subjected to a process wherein one of the surface sections is partially removed or penetrated to expose the intermediate section partially.

In a typical embodiment the upstream surface section is etched off in a regular pattern in a device 44. Alternatively the upstream surface section may be provided with apertures in a mechanical treatment in a device 46.

Again a sheet material 50 according to the present invention is obtained which is wound on a roll 52 or cut into size.

In the following an exemplary recipe for the formulation of a pulp suspension is presented and the sheet materials obtained are characterized.

EXAMPLES

For the manufacturing of a wet-laid fibrous filter sheet material, e.g., in the above-described process, a pulp suspension of the following components is prepared:

| | |
|---|---|
| 40 | parts of cellulosic fibers (e.g. 20 parts short fibers of the type Ceasa of CEASA/ENCE plus 20 parts long fibers of the type Georianier of Rayonier) |
| 1.5 | parts of a binder (e.g. epichlorohydrin resin) |
| 40 | parts of kieselgur (e.g., CBL 3 of CECA) |
| 20 | parts of perlite (e.g., H-800 of Lehmann & Voss) and water. |

The above identified components are suspended in water, the water content being about 90% by weight.

The so formed pulp suspension is dispensed onto a water pervious belt in a thickness of about 5 mm. The dispensed pulp suspension is supported on the belt surface while roughly about 50% of the original water content is drained through the belt.

Thereafter the partly drained dewatered pulp suspension travels still supported by a belt through a thermal dryer where the water content is reduced to about 1% or less. Once the temperature of the fibrous mass raises the binder is activated and bonds the fibrous mass. A self-supporting sheet material is formed. The thickness of the sheet materials is about 3.7 mm. Such a sheet material typically shows a permeability of about 150 $l/m^2 \times min$ at 20° C. and a delta p of 1 bar.

During draining of the water content through the belt as well as the thermal drying procedure water flows downwards to the belt surface entraining parts of the suspended components of the pulp suspension to the lower surface thereof resting on the surface of the belt. During the thermal drying step the top surface of the pulp material heats up first and to higher temperatures than the lower portions of the pulp material.

Surface tension effects tend to lift up to and retain smaller particles, including fibers, at the pulp surface. Subsequently, supported by capillary action water is transported to the top surface of the pulp suspension and may additionally entrain components of the pulp material to the top surface section. Upon progressing drying and progressing solidification of the pulp material the capillary action and the downward draining comes to an end because of the thermal activation of the binder.

As a result the final filter sheet material obtained has a three-sectioned structure with a denser top and bottom section or zone and a less dense intermediate zone or section. It is apparent from the above that while the section structure is clearly identifiable the sections form an integral, unitary structure.

Figure 3:
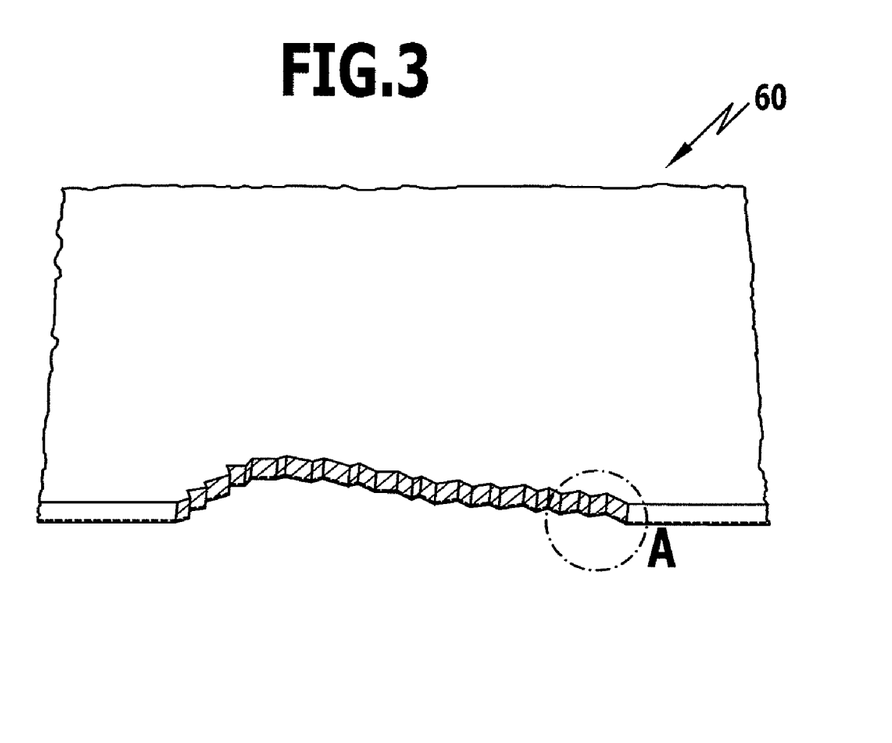
FIG. 3 is a perspective view of a depth filter sheet according to a first embodiment of the present invention.

FIG. 3 shows a depth filter material 60 according to the present. The depth filter material 60 has been manufactured by a wet-laying process using an aqueous fibrous mass as outlined in connection with FIG. 1.

Figure 4:
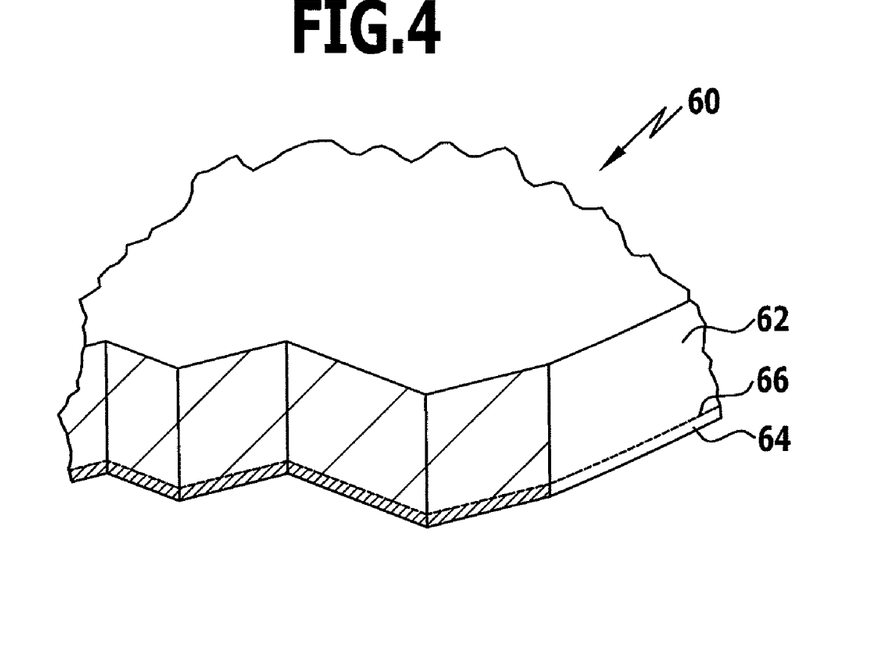
FIG. 4 shows an enlarged part of the depth filter sheet of FIG. 3.

The depth filter material 60 consists of a first section 62 and a second section 64 as can be best seen in FIG. 4. Section 62 has a thickness larger than the thickness of section 64. Furthermore the specific gravity of section 64 is greater than the specific gravity of section 62.

The two sections 62 and 64 are integrally formed in a single step during the above-mentioned wet-laying process and made from the same starting material. Nevertheless, because of the peculiarities of the wet-laying process the permeability and eventually the composition of the second section 64 will differ from the characteristics of section 62. The higher density of section 64 corresponds to lesser permeability of this section as compared to the permeability of section 62.

Since the first and second sections 62 and 64 are manufactured during a single step from the same mass material the characteristics of section 62 and section 64 change gradually within a narrow transitional zone indicated schematically as a dashed line 66 in FIG. 4.

Section 62 is the one of the sections which provides for the filter capacity of the inventive filter sheet material. Therefore the thickness of section 64 is preferable small as compared to the thickness of section 62.

Typically the thickness of the first section 62 amounts to about 5 times the thickness of the second section 64 or more, more preferably to about 10 times or more.

The permeability of section 62 is greater than the permeability of the second section 64. Although the increase of the permeability of sheet material 60 as compared to the permeability of the above described three-section material is somewhat limited, surprisingly a considerably higher particle hold-up volume or capacity is created by the present invention.

The second section 64 provides for additional mechanical stability.

It is a further peculiarity of the wet-laying process that in the single process step where the two sections 62 and 64 are formed a top surface section is formed which also has a more dense structure and hence a lower permeability than the first section 62. The inventors to the present invention have found out that this top surface section partially forms a bar for the access of the non-filtrate to the underlying first section 62. Therefore, such top surface section has been completely removed in order to expose the first section 62 directly to the non-filtrate.

According to a second aspect of the present invention a direct access of the non-filtrate is provided differently as will be discussed in connection with the representations of further embodiments of the present invention of FIGS. 5 to 10.

The bottom surface has a slightly uneven structure resulting from the belt surface structure as is shown in the photograph of FIG. 2a. The top surface shows a slightly uneven or ripply structure as shown in the photograph of FIG. 2b.

As noted before, the above described three-sectioned material forms a filter sheet material of a thickness of about 3.7 mm and has a permeability of 150 l/m²×min at 20° C. and calculated for a delta p of 1 bar.

In order to produce a filter sheet material according to the embodiment of the present invention represented in FIGS. 3 and 4 the top surface section has been removed, e.g., by peeling or abrading the same off. The resultant filter sheet material has a two section structure only (cf. FIGS. 3 and 4) and a thickness of about 3.2 mm. In case the upper surface section is abraded, the above noted permeability increases to some extent whereas the capacity or particle hold-up volume increases to a much larger extent. In case the bottom surface section is abraded, a somewhat less but still marked increase of the particle hold-up volume is observed.

A still further alternative includes a needling process where the needles hit in an overlapping manner 100% of the surface of the filter sheet material. Although the material constituting the top surface is not removed from the sheet material but rather disintegrated the filtration characteristics of the filter sheet material will correspond to the characteristics of a sheet material where the top surface has been removed completely.

For producing the filter sheet materials of the embodiments of FIGS. 5 to 10 the top surface section is not peeled off nor abraded and also the bottom surface section is retained. These embodiments correspond to the second aspect of the present invention.

A number of techniques may be used to provide the apertures which will be described in the following in connection with FIGS. 5 to 10 in detail.

Figure 5:
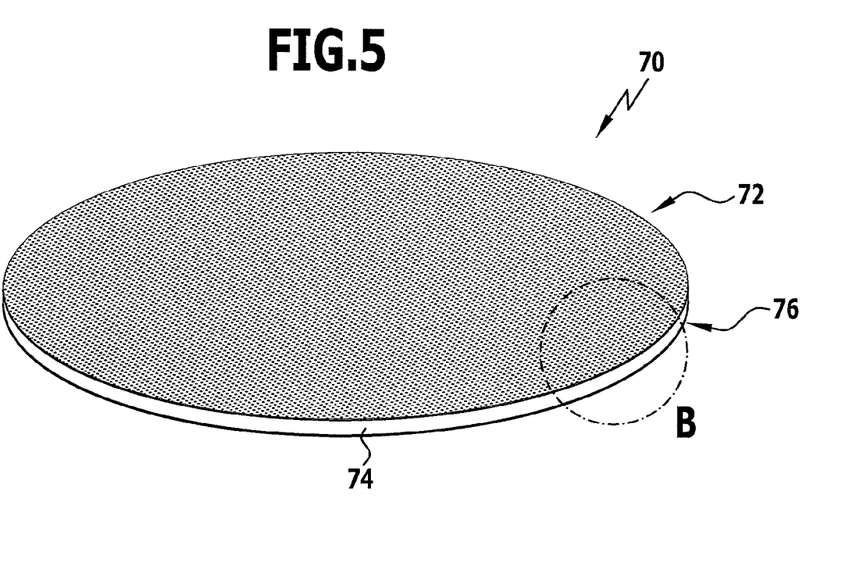
FIG. 5 is a perspective view of a depth filter sheet according to a second embodiment of the present invention.
Figure 6:
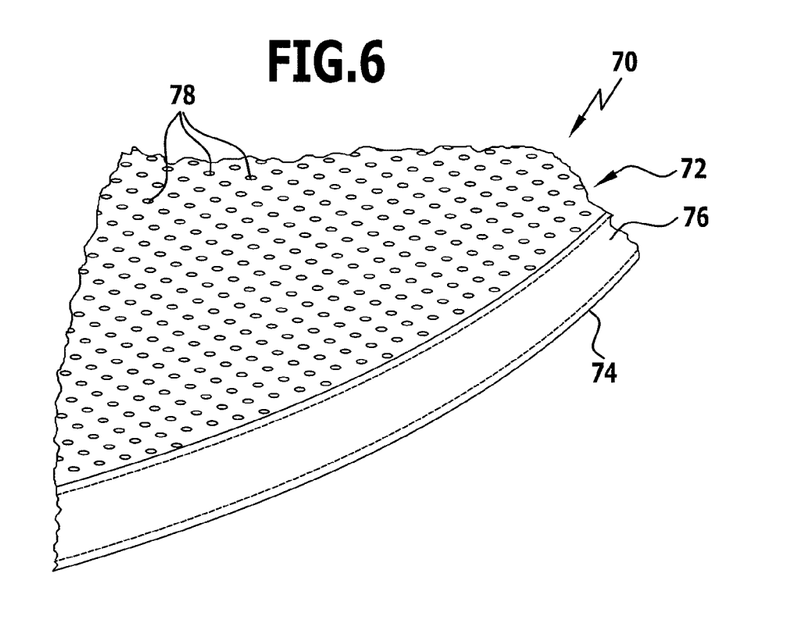
FIG. 6 shows an enlarged part of the depth filter sheet of FIG. 5.

FIG. 5 shows a disk 70 of a filter sheet material obtained in the above mentioned process where the upstream surface section has not been removed. It therefore shows a three-section structure comprising a first and a second surface section 72, 74 and an intermediate section 76. The sheet material has been subjected to a separate manufacturing step where the first surface section 72 has been provided with apertures 78 which are more easily apparent from the enlarged detail of FIG. 5 as represented in FIG. 6. The apertures 78 are provided in a manner that they fully transect the first or upstream surface section 72.

Needling of the sheet material as obtained in a wet-laying process described above with an average aperture number per square cm of about 100 and a depth of about 50% provides an increase of the permeability of about 5%, the average cross-sectional area of an aperture amounting to about 8 $\mu m^2$. Again, surprisingly a drastic increase in capacity or particle hold-up volume of about 30% is obtained as compared to the non-modified three-section material.

Figure 7:
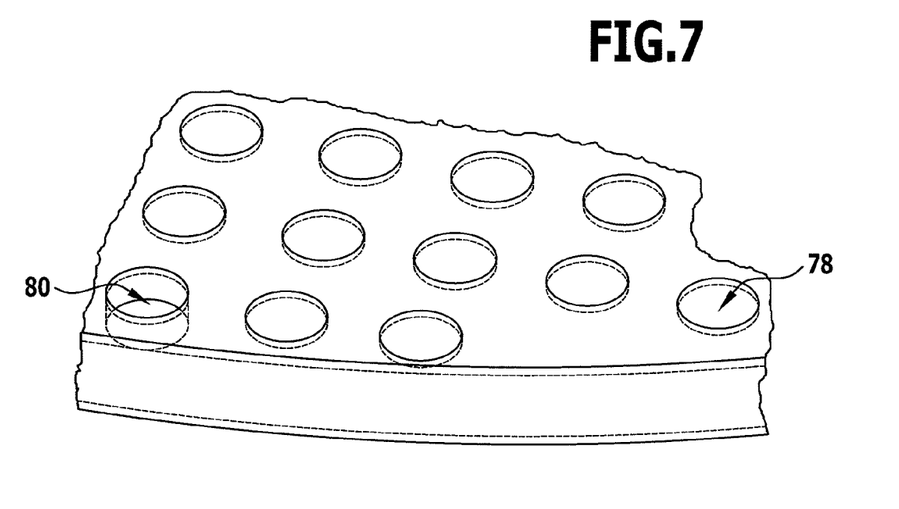
FIG. 7 shows an enlarged part of the depth filter sheet of a third embodiment of the present invention.
Figure 8:
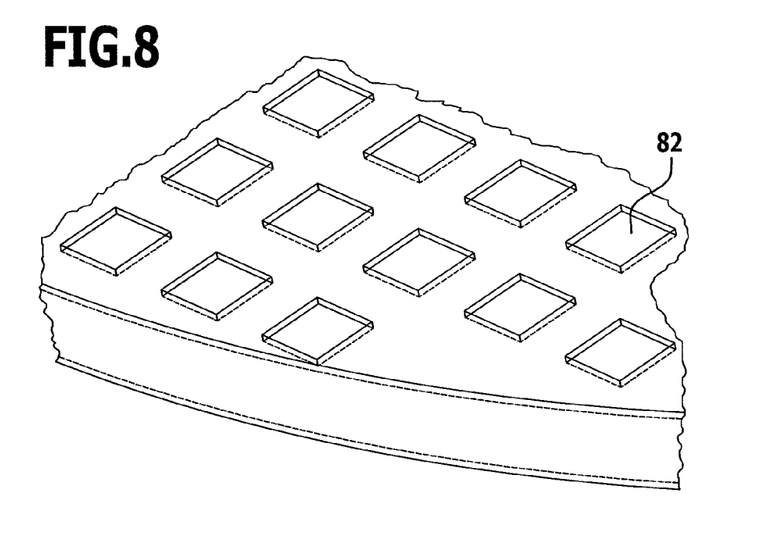
FIG. 8 shows an enlarged part of the depth filter sheet of a fourth embodiment of the present invention.
Figure 9:
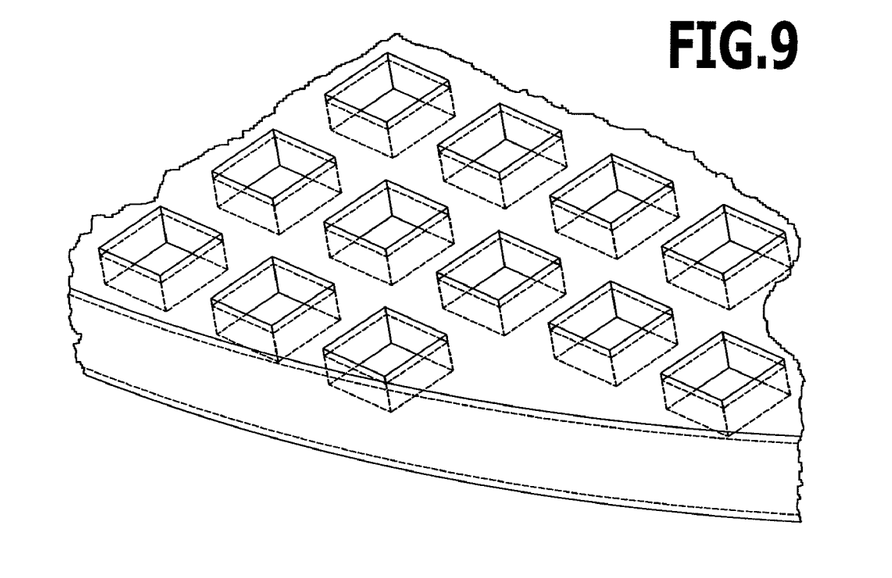
FIG. 9 shows an enlarged part of the depth filter sheet of a fifth embodiment of the present invention.

In the even larger scale representations of FIGS. 7 to 9 various cross sections of the apertures 78 are shown.

FIG. 7 shows apertures 78 with circular cross-sections and having a depth to provide free access for a fluid to be filtered to the uppermost part of the intermediate section 76. In a variation thereof aperture 80 shows an aperture which extends into the upper most portion of the intermediate section providing an increased area of the intermediate section presented to the fluid to be filtered.

Similarly FIG. 8 shows apertures 82 with square shaped cross-section which extend through the first surface section 72 and provide access to the fluid to be filtered to the upper most part of the intermediate section 76.

Again a variant is shown in the form of aperture 84 in FIG. 9 which extends into the uppermost portion of the intermediate section 76 thereby increasing the surface area of the intermediate section presented to the fluid to be filtered.

Figure 10:
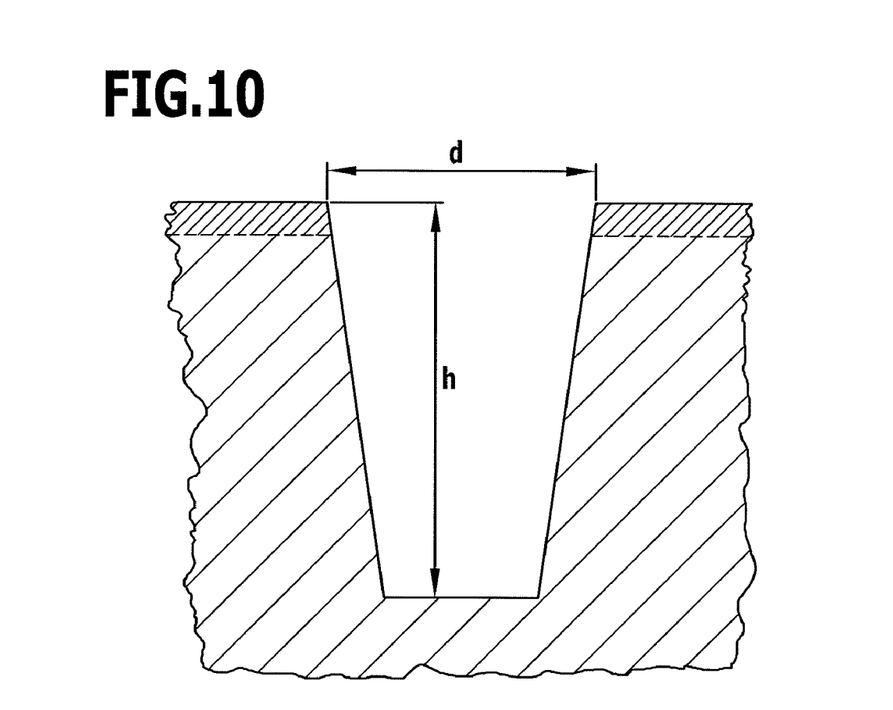
FIG. 10 shows a partial cross-section an enlarged part of the depth filter sheet of a sixth embodiment of the present invention.

FIG. 10 finally demonstrates how the cross-section of an aperture taken parallel to the central axis thereof may look like. The cross-section shown in FIG. 10 typically results from a needling process.

The invention claimed is:

1. A method for manufacturing a depth filter sheet material, said method comprising
    preparing a flowable aqueous pulp composition comprising a fibrous material and a binding agent;
    dispensing the flowable aqueous pulp composition onto a water permeable support in a predetermined amount per unit area;
    at least partially draining water content of the aqueous pulp composition through said water permeable support;
    subjecting said at least partially drained pulp composition to drying at an elevated temperature to form a depth filter sheet raw material comprising a first surface section and a second surface section forming an upper and a lower surface of the sheet raw material, respectively, and an intermediate section positioned in between and integrally formed with the first and the second surface sections, said intermediate section having a permeability greater than the permeability of the first and second surface sections; and
    removing or displacing at least portions of one of the first surface section or the second surface section of the raw material.

2. The method of claim 1, comprising removing or displacing at least portions of said first surface section.

3. The method of claim 1, comprising removing or displacing the first surface section of the raw material to an extent corresponding to about 5% of the area of the upper surface or more.

4. The method of claim 3, wherein the first surface section of the raw material is removed to an extent corresponding to about 100% of the surface area.

5. The method of claim 1, wherein removing or displacing includes abrading, peeling, etching, needling and/or laser treatment.

6. The method of claim 1, wherein removing or displacing generates a plurality of apertures in one of the first surface section or the second surface section, said apertures being distributed in a regular pattern about a corresponding surface of the sheet material.

7. The method of claim 6, wherein the average area covered by an aperture amounts to about 1 $\mu m^2$ or more.

8. The method of claim 7, wherein the average area covered by an aperture amounts to about 100 $mm^2$ or less.

9. The method of claim 1, comprising removing or displacing portions of said surface sections to an extent amounting to about 5% of the thickness of the sheet material or more.

10. The method of claim 9, comprising removing or displacing portions of said surface sections to an extent amounting to about 90% of the thickness of the sheet material or less.

11. The method of claim 1, wherein said fibrous material of said flowable aqueous pulp composition comprises fibers of cellulosic origin and/or of a synthetic polymer.

12. A depth filter sheet material obtained according to the method of claim 1.

13. The depth filter sheet material of claim 12, wherein said first surface section constitutes an upstream surface of the sheet material and said second surface section defines a downstream surface;
  said intermediate section having a permeability greater than the permeability of the first surface section.

14. The depth filter sheet material of claim 13, wherein said sheet material comprises a plurality of apertures extending from the upstream surface of the sheet material through the first surface section down to or into the intermediate section and providing a direct, unobstructed fluid pathway from the upstream surface to the intermediate section.

15. The depth filter sheet material of claim 14, wherein said apertures provide an increase of the upstream surface area of about 300% or less as compared to the surface area not comprising the apertures.

16. The depth filter sheet material of claim 1, wherein said sheet material comprises about 600 apertures per square cm or less at its first surface section.

17. The depth sheet filter material of claim 11, wherein said intermediate section has a substantially homogeneous structure.

18. The depth sheet filter material of 11, wherein said intermediate section has a structure with a decreasing density in the direction from the first surface section to the second surface section.

19. The method of claim 11, wherein the flowable aqueous pulp composition further comprises an active ingredient and/or a filler.

* * * * *